United States Patent [19]

Bast et al.

[11] Patent Number: 4,560,831
[45] Date of Patent: Dec. 24, 1985

[54] MOBILE TELEPHONE MOUNTING PEDESTAL

[76] Inventors: Gordon B. Bast, 3N060 Woodcreek La., West Chicago, Ill. 60185; Carl W. Metz, 804 S. 4th St., St. Charles, Ill. 60174; John F. Nicholas, 41 Janata Blvd., Lombard, Ill. 60148

[21] Appl. No.: 629,019

[22] Filed: Jul. 9, 1984

[51] Int. Cl.$^4$ .............................................. H04Q 7/04
[52] U.S. Cl. .................................... 179/2 E; 179/149; 179/2 EB
[58] Field of Search ............................. 179/2 E-2 EC, 179/149–152; 455/89, 90

[56] References Cited

U.S. PATENT DOCUMENTS

| | | | |
|---|---|---|---|
| 2,521,043 | 9/1950 | Citso | 179/149 |
| 2,621,262 | 12/1952 | Hoagland | 179/149 |
| 2,657,278 | 10/1953 | Le Noir | 179/149 |
| 2,682,580 | 6/1954 | Chin et al. | 179/149 |

Primary Examiner—Gene Z. Rubinson
Assistant Examiner—W. J. Brady
Attorney, Agent, or Firm—McDermott, Will & Emery

[57] ABSTRACT

A swiveling, tilting mobile telephone mounting pedestal is disclosed. This improved mounting pedestal allows a mobile telephone to be mounted conveniently and easily in a vehicle and includes a removable telephone mounting adapter plate so that one of a number of adapter plates may be used if desired. These adapter plates allow for easy mounting and removal of the telephone instrument of any mobile telephone manufacturer. The telephone pedestal provides a pivoting articulated telephone mounting arm quickly adjustable to suit the individual preferences of a number of users within a given vehicle. The pedestal includes a base portion which is typically secured to the vehicle within easy reach of the users. Locking devices on the base and the articulated arm permit adjustment of the telephone instrument to an infinite number of positions.

11 Claims, 16 Drawing Figures

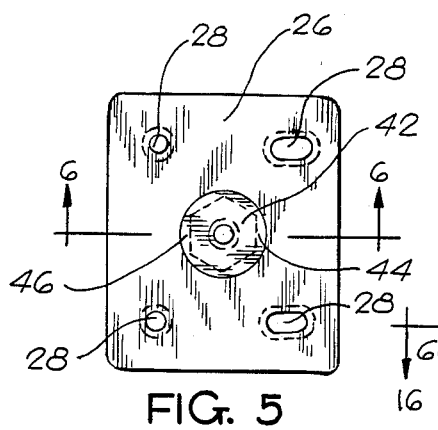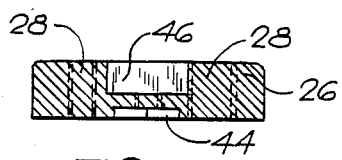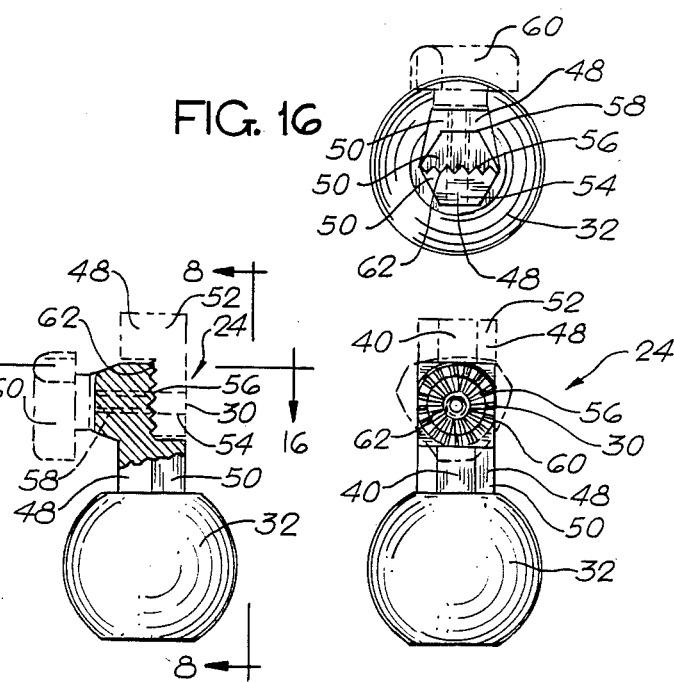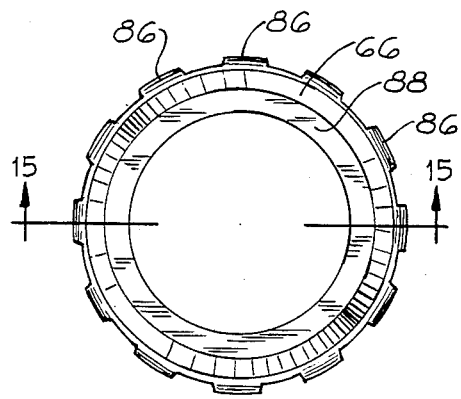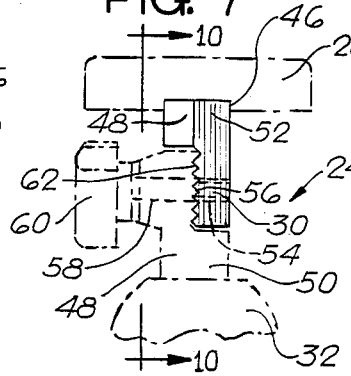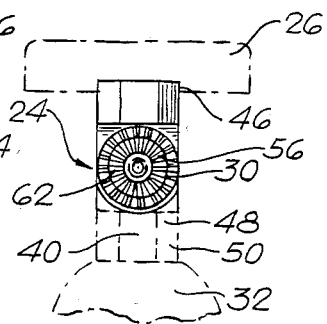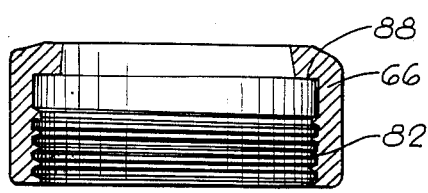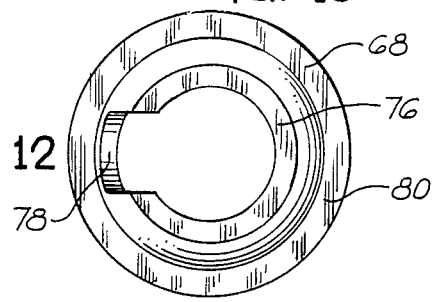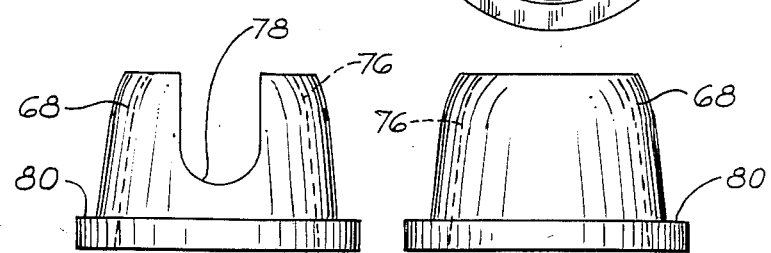

MOBILE TELEPHONE MOUNTING PEDESTAL

BACKGROUND OF THE INVENTION

1. Field of the Invention

The present invention relates to mounting pedestals for mobile telephones and, in particular, to an improved readily adjustable mounting pedestal adaptable for use with any brand of telephone instrument, in any model of automobile or other vehicle, and by any individual in the vehicle.

2. Brief Description of the Background Art

Mounting pedestals now used are generally designed for particular telephones and are normally adjustable in only a limited fashion. These prior art pedestals often proved inconvenient and lack many of the features of the present invention. Since prior art pedestals fit only a limited number of telephones, often mobile telephone installers are not familiar with the procedures to install a particular pedestal and therefore installation requires additional time and expense. Also a pedestal designed to fit a particular telephone is generally not designed to facilitate eacy model or brand interchanging since this updating usually requires installation of a new pedestal. Prior art mobile telephone pedestals typically allow only minor positioning adjustment if any. They are not generally designed to be usable by different people located in the various positions in a vehicle, and are not often adjustable for even the sole person usually intended to use the telephone. The limited adjustment capability of these prior art mobile telephone pedestals restricts the variety of automobiles in which the assembly can be installed and severely limits the usefulness of the installed assembly to the customer.

SUMMARY OF THE INVENTION

It is an object of this invention to provide a pedestal for a mobile telephone that provides a telephone mounting plate adaptable for any mobile telephone.

It is another object of this invention to provide a mobile telephone pedestal which, by virtue of its convenient mounting and adjustment capabilities, allows for nearly unrestricted installation in any type or make of vehicle.

It is a specific object of this invention to provide a mobile telephone pedestal wherein the telephone mounting arm may be laterally displaced about the pedestal to adjust the apparatus to suit any customer at any location in the vehicle.

It is an object of this invention to provide for a mobile telephone pedestal which allows easy assembly and removal of the telephone from its base.

It is yet another specific object of this invention to provide for a mobile telephone pedestal wherein the installed telephone may be oriented in the planar attitude desired by the user of the instrument.

It is yet another object of this invention to provide for a mobile telephone pedestal assembly whose comprising elements may be produced quickly at minimal expense.

In a broad embodiment of the invention these objects and others are provided by an improved pedestal construction which includes a base portion designed to be mounted on the floor or console of any vehicle within reach of the user. The top section of this base is threaded and includes a socket to function as a receptacle for a telephone mounting arm. The telephone mounting arm includes, on one end, a ball adapted to engage this socket and, on the other end, means to attach an interchangeable telephone mounting plate. The mounting plate and ball are secured to an articulating spaced. The three as a unit comprising an assembled telephone mounting arm. An articulating elbow joint in the telephone mounting arm allows planar adjustment of the telephone mounting plate and in conjunction with the unlimited rotation of the ball-socket effectively provides adjustment of the telephone mounting plate in infinite planes. The ball-socket and elbow joint combination also allows the positioning of the telephone instrument at a desired attitude within the constraints of these planes. The elbow joint locks with complementary serrations secured by a thumbscrew. A threaded crown mates with the upper threaded portion of the base to provide for a manual locking action. A pressure fitting under the crown contacts the upper surface of the ball forcing it against the socket in the base thereby locking the mounting arm in a desired position. The pressure fitting contains a slot adapted to accept the articulated spacer in a horizontal position. The elbow joint may then be used to orient the telephone instrument upwardly for use when the telephone is usefully displaced tangentally from the mounted pedestal in the direction of the slot. By rotating the pressure fitting the telephone may then be directed towards a particular user in the vehicle.

BRIEF DESCRIPTION OF THE DRAWINGS

FIG. 5 is a top view of an interchangeable telephone mounting adapter plate shown in FIG. 1.

FIG. 6 is an elevational side perspective view of the interchangeable telephone mounting adapter plate.

FIG. 7 is a partially cut-away elevational side view of an elbow joint in an articulated telephone mounting arm shown in FIG. 1.

FIG. 8 is an elevational side perspective view of the elbow joint in the articulated telephone mounting arm taken generally along the line 8—8 in FIG. 7.

FIG. 9 is an elevational side perspective view of a complete telephone mounting arm shown in FIG. 1.

FIG. 10 is a partially cut-away elevational side view of the complete telephone mounting arm taken generally along the line 10—10 in FIG. 9.

FIG. 11 is an elevational side perspective view of a pressure fitting shown in FIG. 1.

FIG. 12 is a top view of the pressure fitting illustrating a slot shown in FIG. 1 adapted to receive the telephone mounting arm.

FIG. 13 is a elevational side perspective view of the pressure fitting illustrating the telephone mounting arm receiving slot.

FIG. 14 is a top view of a knurled crown shown in FIG. 1.

FIG. 15 is a cut-away elevational side view of the knurled crown taken generally along the line 15—15 in FIG. 14.

FIG. 16 is a partially cut-away top view of the elbow joint in the articulated telephone mounting arm taken generally along the line 16—16 in FIG. 7.

DETAILED DESCRIPTION OF THE INVENTION

Figure 1:
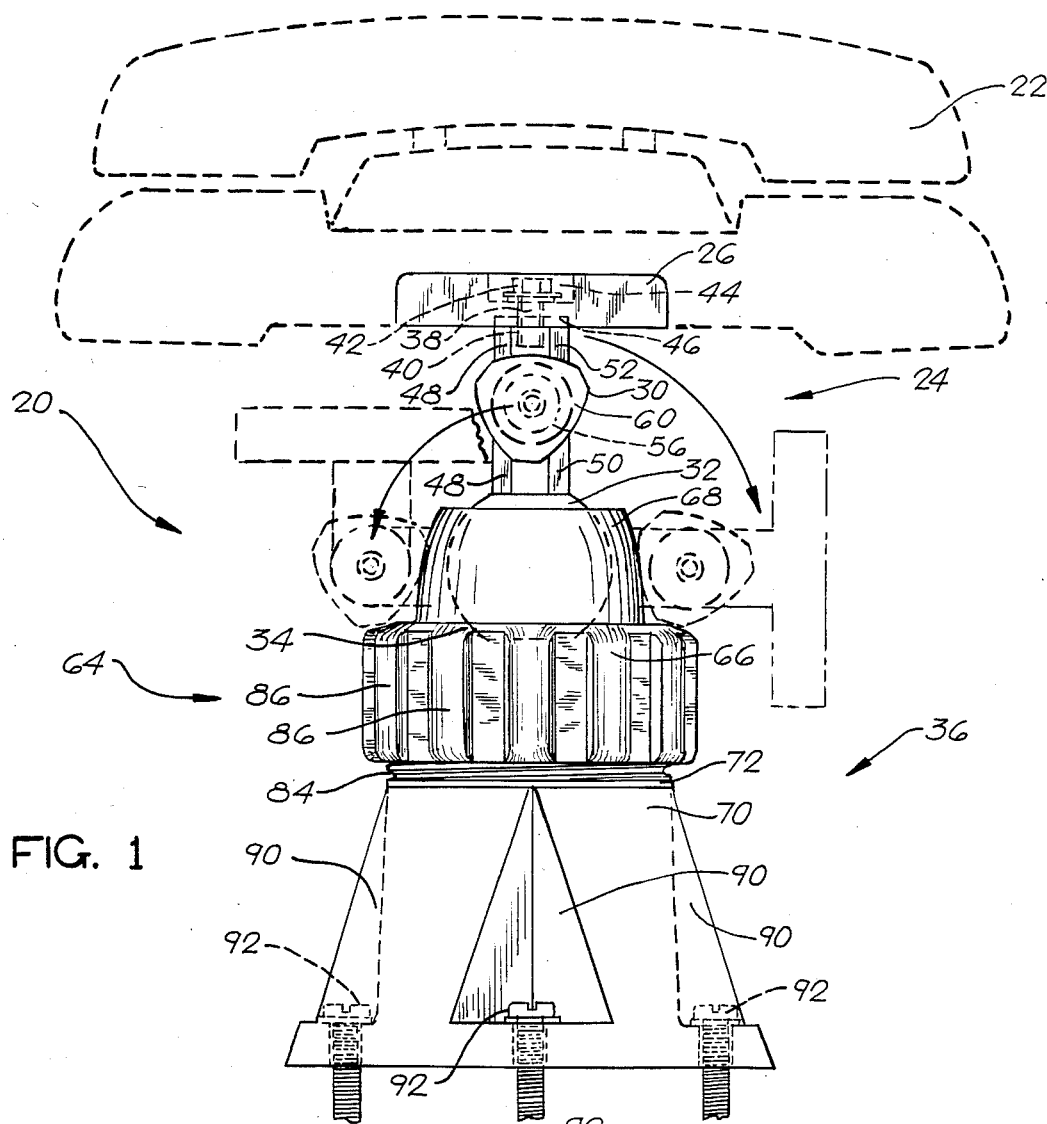
FIG. 1 is an elevational side view of the assembled present invention illustrating its use with a telephone instrument (shown in phantom).
Figure 2:
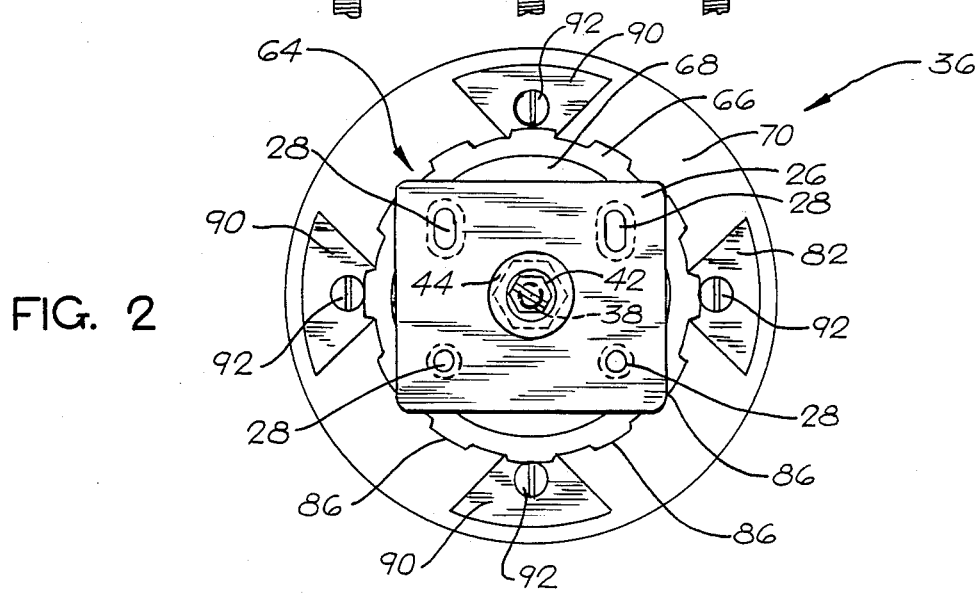
FIG. 2 is a top view of the invention shown in FIG. 1 with the telephone removed for clarity.
Figure 3:
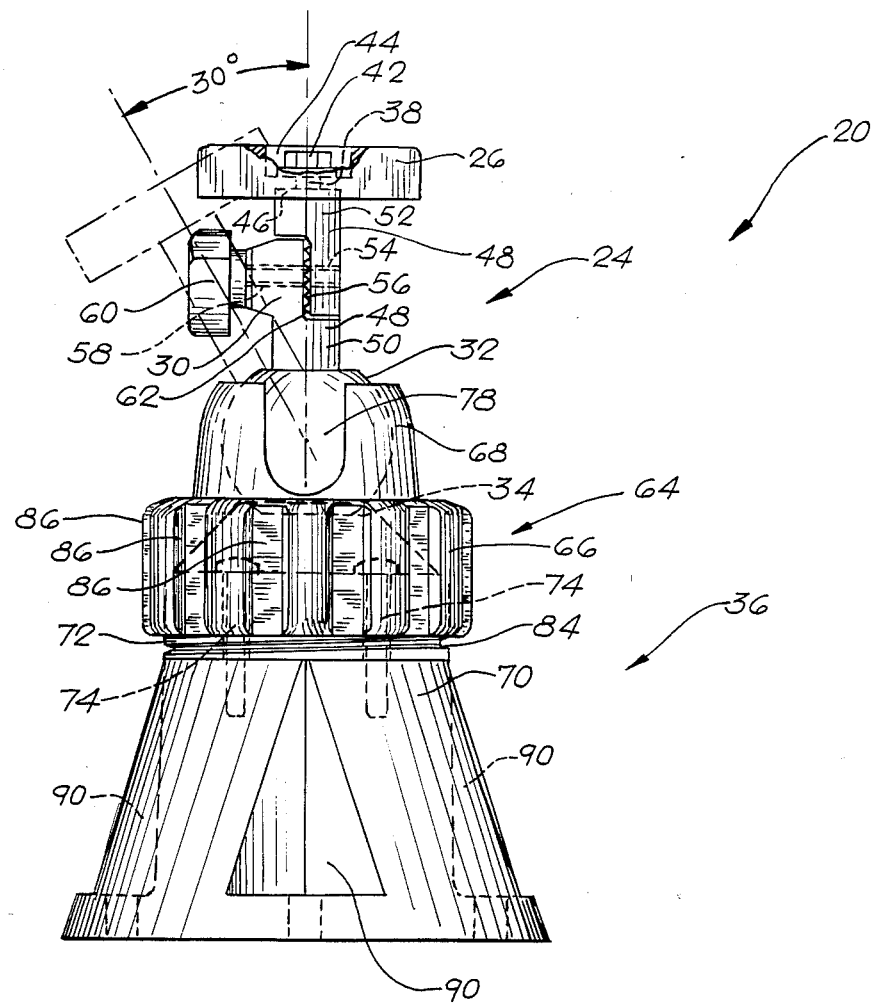
FIG. 3 is an elevational side perspective view of the invention shown in FIG. 1 with the telephone removed for clarity.

The present invention disclosing its several improvements over the prior art is shown in FIG. 1 and generally designated 20. A mobile telephone set 22 is shown in phantom to illustrate the use of the invention. The mobile telephone 22 attaches to a telephone mounting arm, generally designated 24, by the telephone mounting plate 26. The telephone mounting plate 26 has mounting points 28 for particular models of mobile telephones 22 and may be interchangeable on a telephone mounting arm 24 with other mounting plates 26, if desired. The telephone mounting arm 24 is comprised of the mounting plate 26, an articulating elbow assembly 30, and a ball 32. The ball 32 is adapted to engage a socket 34 in the pedestal base assembly, generally designated 36. The mounting plate 26 and the ball 32 are connected to either end of the elbow assembly 30 by threaded bolts 38. These bolts are received in complementary threaded bores 40 in the elbow assembly 30. Bolt heads 42 are countersunk in apertures 44 in both the ball 32 and the telephone mounting plate 26. These apertures 44 allow the bolt heads 42 to lie flush with the mounting plate 26 and the ball 32. Elbow assembly 30 is inserted into shallow bores 46 in mounting plate 26 and ball 32 of substantially identical diameter to elbow assembly 30 to add rigidity to the assembled telephone mounting arm 24. The elbow assembly 30 comprising the telephone mounting arm functionally consists of two complementary fitting essentially "L" shaped elbow-arms, generally designated 48, of which one, attached to the ball, is the ball elbow-arm 50 and the other, attached to the telephone mounting plate, the telephone mounting plate elbow-arm 52. A threaded bore 54 is present in one complementary face 56 of one of the elbow-arms 48. An unthreaded bore 58 is located in the other elbow-arm 48 substantially opposite to the threaded bore 54. A thumb screw 60 passes through the unthreaded bore 58 into the threaded bore 54 releasably securing the elbow assembly 30 in a desired position. Each opposing complementary face 56 provides a plurality of radial serrations 62 which allow discrete articulation of the elbow assembly 30 when a thumb screw 60 is loosened, yet prevents the shifting of elbow assembly 30 by vehicular vibration or the mass of the telephone instrument 22 when elbow assembly 30 is secured by the tightening of thumbscrew 60.

Figure 4:
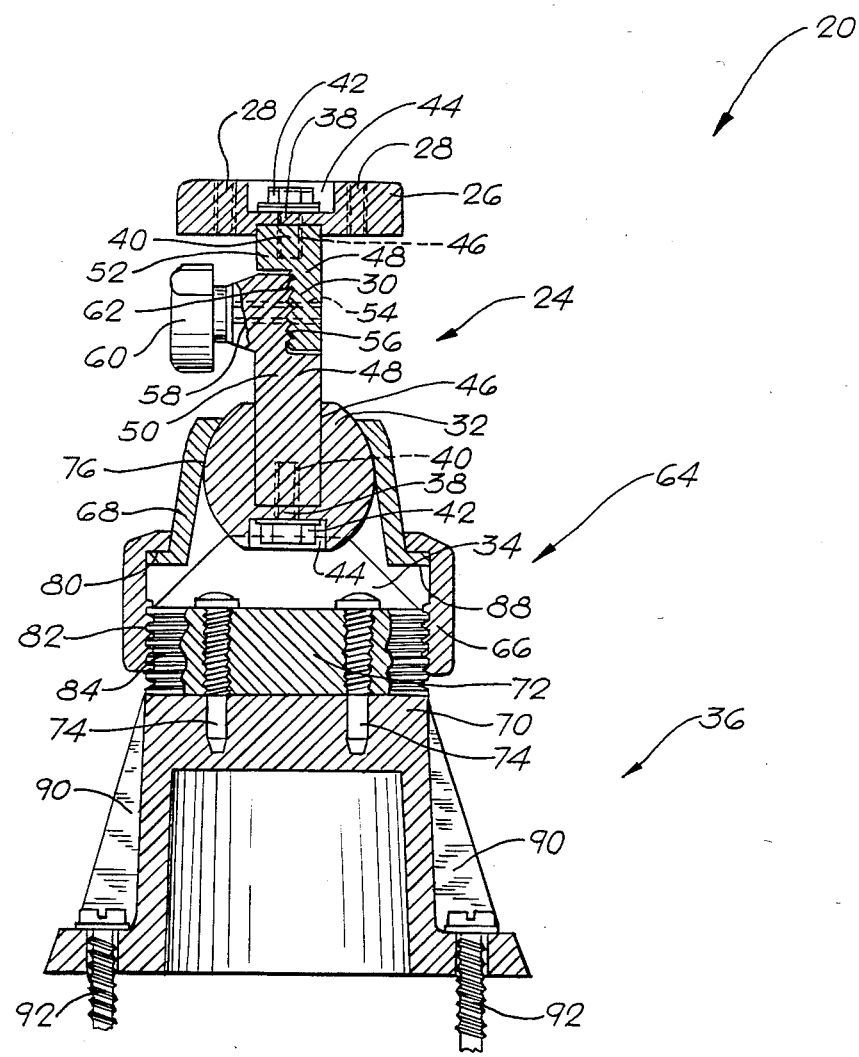
FIG. 4 is vertical sectional view of the invention shown in FIG. 3.

The telephone mounting arm assembly 24 is locked into a desired position by tightening a pedestal crown assembly, generally designated 64. The pedestal crown assembly 64 includes a pedestal crown 66 internally threaded to adapt to the pedestal base assembly 36 and a pressure fitting 68. Pedestal base assembly 36 comprises a pedestal base 70 and an externally threaded disc shaped section 72, as best seen in FIG. 4. Well known means secure disc section 72 to pedestal base 70 such as epoxy resins or attachment bolts 74 as in the present configuration. Significant tooling and production expense is thereby saved utilizing this two piece design given that threaded disc section 72, if desired, may be machined from metal stock for durability while pedestal base 70 need only be inexpensively molded from any suitable polymer. Socket 34 may be formed integrally with disc section 72, or alternatively, may be separate.

If socket 34 is not formed integrally with disc section 72 it is unnecessary to attach socket 34 to disc section 72 as socket 34 will be retained in position by ball 32 and crown assembly 64. The pressure fitting 68, as best seen in FIGS. 4, 11, 12 and 13 includes a contact surface 76 which may be milled as a flat bevel or machined to an appropriate arc so as to properly engage the ball 32. The construction of the pressure fitting 68 allows unrestricted rotation of telephone mounting arm 24. The pressure fitting 68 includes a slot 78 adapted to receive the ball elbow-arm 50. The telephone mounting arm 24 may therefore be pivoted from vertical to horizontal. The elbow assembly 30 is then employed to pivot the telephone 22 from vertical to horizontal and the construction of pressure fitting 68 allows unrestricted rotation of the telephone mounting arm 24, thereby allowng the telephone instrument 22 to be axially displaced towards the user as well as allowing the telephone instrument 22 to be oriented both facing and tilting towards that same user. The design of the present invention further allows unrestricted rotation of the pressure fitting 68 thereby providing that the telephone 22 may be so properly oriented for all the users in the vehicle. Additionally, variations in height of the telephone are possible to better accommodate installation in different vehicles by exchanging the mounting plate elbow-arm 52 with a larger or shorter unit as required.

A lip 80 is provided on the pressure fitting 68 to contact and receive the locking force of the crown 64 when the crown 66 is tightened on the base 36 via its internal threading 82. The crown 66 tightens on externally threaded disc section 72 on the top of pedestal base 70. The crown 66 is deeply knurled to provide a plurality of vertical ribs 86 to facilitate manual tightening and loosening of the crown 66. The crown 66 includes a contact surface 88 to engage the lip 80 of pressure fitting 68 to force the pressure fitting 68 against the ball 32 to lock the telephone mounting arm 24 in its desired position.

The pedestal base 70 is generally conical in shape and contains a plurality of vertical channels 90. These channels 90 are flaired inwardly from the top to the bottom of the base 26 and have the effect of countersinking the pedestal base attachments bolts 72. The underside of the pedestal base 70 is somewhat hollowed out to minimize weight and cost while permitting easier mounting of pedestal assembly 36 with fewer constraints.

It should be understood that various modifications within the scope of this invention can be made by one of ordinary skill in the art without departing from the spirit thereof. Therefore, the invention should be defined by the following claims as broadly as the prior art will permit and in view of the specifications if need be.

We claim:

1. A mobile telephone mounting pedestal for use in mounting a telephone instrument in a vehicle comprising:
a base having a circular upper portion, a lower portion for mounting the base to a vehicle, and means for securing the lower portion to a vehicle;
an articulating telephone mounting arm including an upper end thereof for connection to a telephone instrument and a lower end terminating toward the upper portion of said base;
means for axially adjusting the telephone mounting arm relative to the base, comprising:
 (a) a spherical element attached to and defining a lower terminus of the telephone mounting arm;

(b) a spherical socket located in the upper portion of the base for matingly receiving the spherical element, the socket and the spherical element constituting a ball-and-socket joint; and (c) means for tightening and releasing the ball-and-socket joint to facilitate ajustment of the telephone mounting arm in any one of a plurality of positions relative to the base, such means comprising:

(i) an internally threaded annular crown skirting the circular upper portion of the base, the base upper portion being provided with external threading to receive the annular crown;

(ii) a unitary annular rotatable pressure-fitting mounted between the annular crown and the spherical element, the pressure-fitting being provided with an inner upper surface circumferentially contacting the spherical element at a height thereon above a widest circumference of the spherical element; and (iii) means for engagement between the pressure-fitting and the annular crown such that manual rotation of the crown, causing the same to skirtingly descend the threaded upper portion of the base, results in downward force on both the pressure-fitting and the spherical element, whereby manual rotation of said threaded annular crown loosens or tightens said pressure-fitting which permits loosening and retightening of said ball and socket joint whenever it becomes necessary to adjust the position of the telephone mounting arm for the comfort of the user.

2. The mobile telephone mounting pedestal of claim 1 wherein said telephone mounting arm includes a telephone mounting plate for connection to a telephone instrument and means for removably mounting said plate to said arm thereby permitting interchangeability of a plurality of mounting plates.

3. The mobile telephone mounting pedestal of claim 1 wherein said articulating telephone mounting arm further comprises a pair of complementary fitting generally "L" shaped arms having opposed complementary faces, the arms pivoting about thumbscrew means for releasably securing said articulating telephone mounting arm.

4. The mobile telephone mounting pedestal of claim 3 wherein said articulating telephone mounting arm further comprises a plurality of radial serrations on the opposed complementary faces of said "L" shaped arms.

5. The mobile telephone mounting pedestal of claim 4 wherein said base comprises a truncated conical element having a plurality of vertical channels formed about its lower periphery to provide countersunk mounting locations.

6. The mobile telephone mounting pedestal of claim 5 wherein said annular threaded crown includes a plurality of peripherally extending vertical ribs secured to the outer periphery thereof to facilitate manual rotation of the crown.

7. The mobile telephone mounting pedestal of claim 6 wherein said threaded circular upper portion of the base comprises a distinct element integral with said socket having means for attachment to said pedestal base.

8. The mobile telephone mounting pedestal of claim 7 wherein said threaded circular upper portion of the base comprises an element distinct from both said pedestal base and said socket, the upper portion having means for attachment to said lower portion of the base.

9. The mobile telephone mounting pedestal of claim 1 wherein said means for engagement between said pressure-fitting and said annular crown comprises:

(a) rim means located on and extending circumferentially about a top periphery of said annular crown, and extending radially inwardly therefrom; and (b) flange means located on and extending circumferentially about a bottom periphery of said pressure fitting, and extending radially outwardly therefrom, said pressure fitting being mounted between said spherical element and said annular crown such that an under surface of said crown rim means is engageable with an upper surface of said pressure- fitting flange means.

10. A tiltable, rotatable, displaceable mobile telephone mounting pedestal, comprising:

(A) a truncated conical pedestal base including:
  (1) a plurality of vertical channels in said base flaring inwardly from top to bottom providing countersunk clearance for a like number of pedestal base attachment bolts;
  (2) a top end including a socket defined therein;
  (3) a threaded section at the top of said base;

(B) a disc shaped pedestal crown assembly including:
  (1) a deeply knurled pedestal crown;
  (2) a pressure fitting designed to be placed inside said crown, said pressure fitting containing a slot extending from the top of said pressure fitting not through to the bottom;
  (3) a threaded section on the inner surface of the pedestal crown for threadingly engaging the top of the base; and (C) a telephone mounting arm assembly including;
  (1) a telephone mounting adapter plate on one end of an articulating elbow assembly and a spherical ball joint element on the other;
  (2) a bolt protruding through said adapter plate into a threaded bore in one end of said articulating elbow assembly;
  (3) a bolt protruding through said spherical ball joint element into a threaded bore in the other end of said articulating elbow assembly;
  (4) said spherical ball joint element being designed to engage the socket of the pedestal base and the pressure fitting contained in the crown assembly whereby the tightening of said crown assembly locks the ball joint element and mounting arm in a desired position;
  (5) said articulating elbow assembly comprising two complementary fitting substantially "L" shaped arms having opposing complementary faces, said arms being pivotable about a thumbscrew, said thumbscrew providing releasable securing means to lock said articulating elbow assembly, the opposing complementary faces of said "L" shaped arms providing a plurality of serrations radially oriented about said thumbscrew, said articulating elbow assembly being designed to fit into said slot in said pressure fitting.

11. The mobile telephone mounting pedestal of claim 10 wherein the pressure-fitting is freely rotatable and is provided with a slot to accommodate the telephone mounting arm, said slot extending vertically from the top periphery thereof not through to the bottom periphery.

* * * * *